April 21, 1936.  C. A. BANNISTER  2,038,469
TRANSMISSION BAND
Filed Dec. 27, 1934
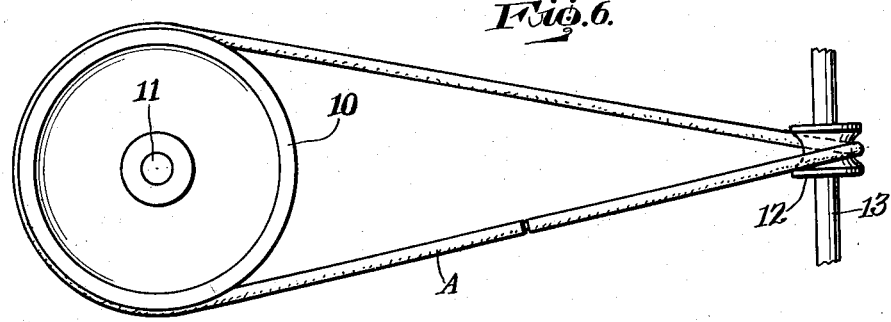
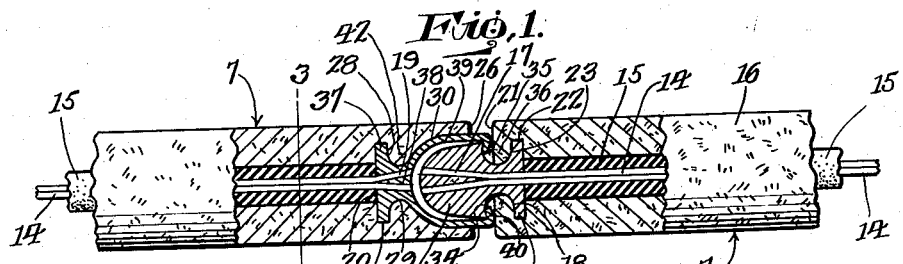
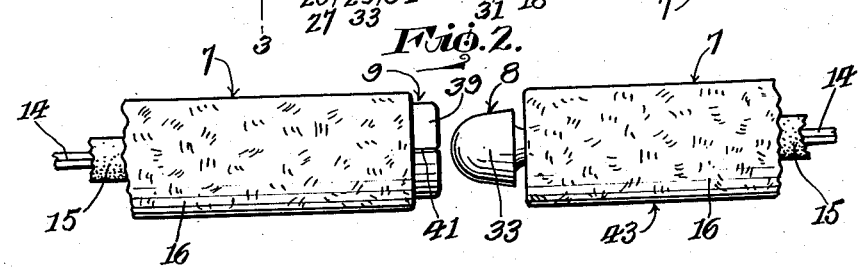
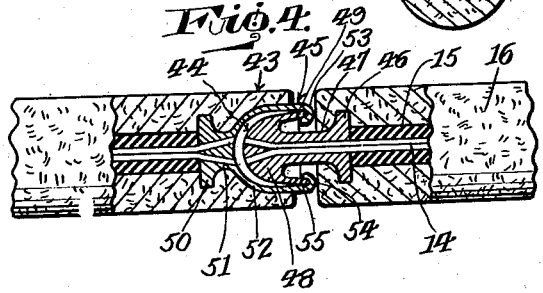
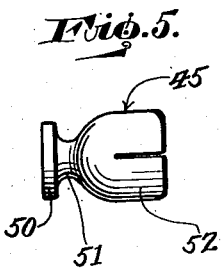
Inventor
Charles A. Bannister
By Geo. P. Kimmel
Attorney Patented Apr. 21, 1936

2,038,469

UNITED STATES PATENT OFFICE 2,038,469

TRANSMISSION BAND

Charles A. Bannister, Firthcliffe, N. Y.

Application December 27, 1934, Serial No. 759,389

6 Claims. (Cl. 74—237)

This invention relates to a transmission band designed primarily for spinning devices of textile machines, but it is to be understood that a band, in accordance with this invention is to be used in any connection for which it may be found applicable, and the invention has for its object to provide, in a manner as hereinafter set forth, a band whereby the natural stretch produced therein by the usual driving tension is reduced to a minimum.

A further object of the invention is to provide, in a manner as hereinafter set forth, a band which is not subjected to atmospheric conditions causing it to stretch and slip.

A further object of the invention is to provide, in a manner as hereinafter set forth, a band having the ends of its body part so connected together to prevent it from becoming loosened or disconnected from wear or strain thereon which it is subjected to when employed for transmission purposes.

A further object of the invention is to provide, in a manner as hereinafter set forth, a band of the class referred to including a body part having its ends connected together whereby, when the band is employed slip and noise due to connector contact with the pulleys is eliminated.

Further objects of the invention are to provide, in a manner as hereinafter set forth, a band which is simple in its construction and arrangement, strong, durable, compact, thoroughly efficient in its use and comparatively inexpensive to manufacture.

To the above ends essentially and to others which may hereinafter appear, the invention consists of such parts and such combination of parts which fall within the scope of the invention as claimed.

In the drawing:

Figure 1 is a fragmentary view in longitudinal section of the band with the ends of the body part thereof connected together, Figure 2 is a fragmentary view in side elevation of the band with the ends of the body part thereof disconnected, Figure 3 is a section on line 3—3, Figure 1, Figure 4 is a view similar to Figure 1 of a modified form, Figure 5 is a side elevation of the female connector employed in the form shown in Figure 4, and Figure 6 is a side elevation showing the adaptation of the band with a spinning device.

With reference to Figures 1, 2, and 3, the band is formed of a flexible body part 7 having its ends formed with connectors 8, 9 to set up the band in an endless manner for its use for transmission purposes as shown in Figure 6, which illustrates a pulley 10 carried by a shaft 11, a pulley 12 carried by a shaft 13 and the band, indicated at A, travelling around the pulleys. The pulley 10 is of greater diameter than the pulley 12. The shafts and pulleys are elements of a spinning device.

The body part 7 includes a metallic sectional core 14 formed of a plurality of wires of the desired gauge which sidewise abut for the major portion of their length, a flexible solid binder 15 snugly encompasses the major portion of the length of the core, maintains the wires in sidewise abutting relation for the major portion of their length and terminates adjacent both ends of the core 14, and a thick tubular fabric casing 16 having a portion completely encompassing, in snug relation, binder 15. The casing 16 terminates adjacent to one end and extends beyond the other end of core 14. The binder 15 preferably is formed of rubber. The thickness of that portion of the body of casing 16 which encompasses the binder corresponds to the diameter of the latter.

That end terminal portion 17, of core 14 which extends from the end 18, of binder 15 is of greater length than the end terminal portion 19, of the core 14 which extends from the end 20, of the binder 15. The wires at the end terminal 17 of core 14 extend at opposite inclinations with respect to each other whereby one end of core 14 is flared. The wires at the end terminal portion 19, of the core 14 extend at opposite inclinations with respect to each other whereby the other end of core 14 is flared.

The casing 16 has its inner face in proximity to the end edge 21 thereof formed with an annular groove 22. The outer wall 23 of groove 22 is flared and merges into an annular rounded surface 25 terminating at the said end edge 21. The inner face of casing 16 adjacent its other end edge 26 is formed with an annular groove 27. The outer wall 28 of groove 27 is flared and merges into an annular rounded surface 29 terminating in the inner end of an annular flared surface 30 extending to the said end edge 26. The distance between the groove 22 and the end edge 21 is materially less than the distance between the groove 27 and the end edge 26. The groove 22 and surface 25 provides one end of the casing 16 with an anchoring means for the connector 8. The groove 27 and surfaces 29, 30 provide the other end of the casing with a combined anchoring and socket forming means for the connector 9. The inner walls of the grooves 22 and 27 are flush with the ends of the binder 15.

The connector 8 is solid and preferably constructed of metal and it consists of a circular inner part 31, a stem 32 arranged axially of, extending outwardly from and of less diameter than part 31, and a semi-oval shaped head 33 having a curved rear end 34. The stem 32 is of less diameter than that and merges into the rear end 34 of head 33 axially of the latter. The part 31, stem 32 and head 33 coact to form the connector 8 with an annular groove 35. The end terminal portion 17 of the core 14, as well as that part of the latter immediately adjacent portion 17 is embedded in and extends from the inner to the outer end of connector 8. The part 31 of connector 8 is seated in and is overlapped, in snug relation, by the front and rear walls of the groove 22. The casing 16 has the end part 36 thereof surrounding, in snug relation, the rear end of stem 32. The end part 36 extends into the groove 35 but does not completely fill the same.

The connector 9 is preferably constructed of metal and it consists of a circular inner part 37, a stem 38, arranged axially of, extending outwardly from and of less diameter than part 37, and a cup-shaped head 39 provided at its outer end with an inwardly extending annular flange 40. The head 39 is split, as at 41, to provide it with a resilient characteristic. The outer end of stem 38 merges into the rear end of head 39, axially of said end. The stem 38 is of less diameter than that of the rear end of head 39. The part 37 is seated in and overlapped, in snug relation, by the front and rear walls of groove 27. The casing 16 has a part thereof, indicated at 42, surrounding in snug relation, the stem 38. The flared surface 30 of the inner face of casing 16 surrounds, in snug relation, the head 39. The latter projects beyond the end edge 26. The end terminal portion 19 of core 14 is embedded in the part 37, stem 38 and inner end of head 39.

When the ends of body part 7 are secured together for the purpose of setting up the band for transmission purposes, the head 33 of connector 8 is extended into the head 39 of connector 9, and the flange 40 of head 39 opposes the rear end of head 33 whereby the ends of body part 7 will be coupled together in a manner as shown in Figure 1. The resilient characteristic of the head 39 will provide for the expeditious entry of head 33 into head 39 and the frictional binding of the latter upon head 33. The head 39 is of less diameter than the outer diameter of casing 16. When the ends of body part 7 are connected together the outer end of head 39 will bear against the end edge 21 of casing 16. The ends of the casing 16 will be arranged in close proximity to each other when the ends of the body part 7 are connected together, and by this arrangement head 39 will not contact with the pulleys 11, 12 when the band travels around them.

The body part 43 of the band shown in Figure 4 is of the same construction as the body part 7. The difference between the form illustrated by Figure 4 and that shown by Figures 1, 2, and 3 resides solely in the construction of the connectors 44, 45 for the end of body part 43. The connector 44 includes a circular inner part 46, a stem 47 of greater length than stem 32, and an oval-shaped head 48 having its rear end formed with an annular, flared inwardly directed flange 49. The connector 45 includes a circular inner part 50, a stem 51 and a split cup-shaped head 52 formed at its outer end with an inturned annular portion 53 providing the head 52 at its outer end with an abutment or stop 54 and an internally arranged annular groove 55 for the reception of flange 49. The connectors 44, 45 coact in the manner as shown in Figure 4 for connecting the ends of body part 43 to arrange the band in position for transmission.

The construction as aforesaid of the band provides the latter with the following advantages: it is unaffected by atmospheric conditions; normal stretch under load is reduced to a negligible amount since the load is carried by the metallic core throughout rather than by the binder covering as is the usual practice; connectors cannot unfasten or cut the material of the body portion; slip and noise due to connector contact with the pulleys are eliminated; due to the flexibility thereof it insures uniform and noiseless operation; permanently anchoring the connectors from slipping relative to or separating from the ends of the body part; anchoring the connectors permanently to the end terminal portions of the non-stretchable core of the body part whereby when the connectors are interengaged the ends of the body part are permanently held connected together; utilizing an element of the body part to prevent the connectors engaging or contacting with the pulleys during the travel of the band when the latter is used for transmitting power; and providing a flexing joint between the connected together ends of the body part of the band.

What I claim is:

1. In a band for the purpose set forth, a flexible metallic core, a flexible binder of less length than that of the core, a tubular fabric casing completely encompassing said binder, said binder being of less length than and located adjacent to the ends of the core, said casing being of greater length than and extended from the ends of the binder, said core being extended at one end from one end of and having its other end arranged inwardly adjacent to the other end of the casing, and connectors extending from the ends of the binder, positioned with and projecting from the ends of the casing, said core having its end terminal portions embedded in the connectors, and said casing and connectors having coacting interengaging parts for anchoring the connectors to the casing.

2. The invention, as set forth in claim 1, having the connectors of less diameter than the outer diameter of the casing and arranged concentrically relatively to the latter.

3. In a band for the purpose set forth, a body part formed of a flexible metallic core, a flexible binder encompassing the major portion and for maintaining the major portion of the length of the sections of the core in abutting relation, said core being extended from each end of the binder, a tubular fabric casing completely encompassing and extending from the ends of the binder, said core having one end extending beyond one end and its other end arranged inwardly adjacent to the other end of the casing, said casing having means within one end thereof adjacent to one end of the binder for anchoring a connector therewith, and said casing having portions within the other end thereof adjacent the other end of the binder to provide a combined anchoring and socket forming means for a connector.

4. A band for the purpose set forth, including a non-stretchable flexible metallic core, oppositely disposed interengaging connectors at the end terminal portions of said core, said end terminal portions being embedded in said connectors, a binder encompassing the major portion of the length of the core and extending from the inner end of one connector to the inner end of the other connector, and a tubular fabric casing encompassing said binder and overlapping and interengaging the inner end terminal portion of one of said connectors and overlapping the major portion of the length of and interengaging in the other connector in proximity to the inner end of the latter.

5. A structure of the character described comprising a flexible band having a flexible metallic core, a binder for encompassing the core throughout the major portion of its length, one of the ends of the core terminating inwardly of one of the ends of the band and the other end of the core being extended from the other end of the band, coupling members carried by opposite ends of the band and core and partially encompassed by the ends of the band, the said couplings coacting to form a connector for the ends of the band, the said coupling members being of less diameter than the band.

6. A structure of the character described comprising a tubular flexible band having a metallic flexible core, a binder for the core throughout the major portion of its length, the said band provided with recesses in its opposite ends, coupling members adapted to engage in the recesses and have connection with the said core, the material of the band adapted to encompass the major portion of one coupling member and a portion of the other member, the coupling members provided with interengaging parts, the said band when coupled together having its ends in close proximity to each other, the diameter of the coupling members being less than that of the band.

CHARLES A. BANNISTER.